Jan. 3, 1928. 1,655,332
F. B. PEDERSEN ET AL
UNIVERSAL JOINT
Filed Nov. 18, 1926
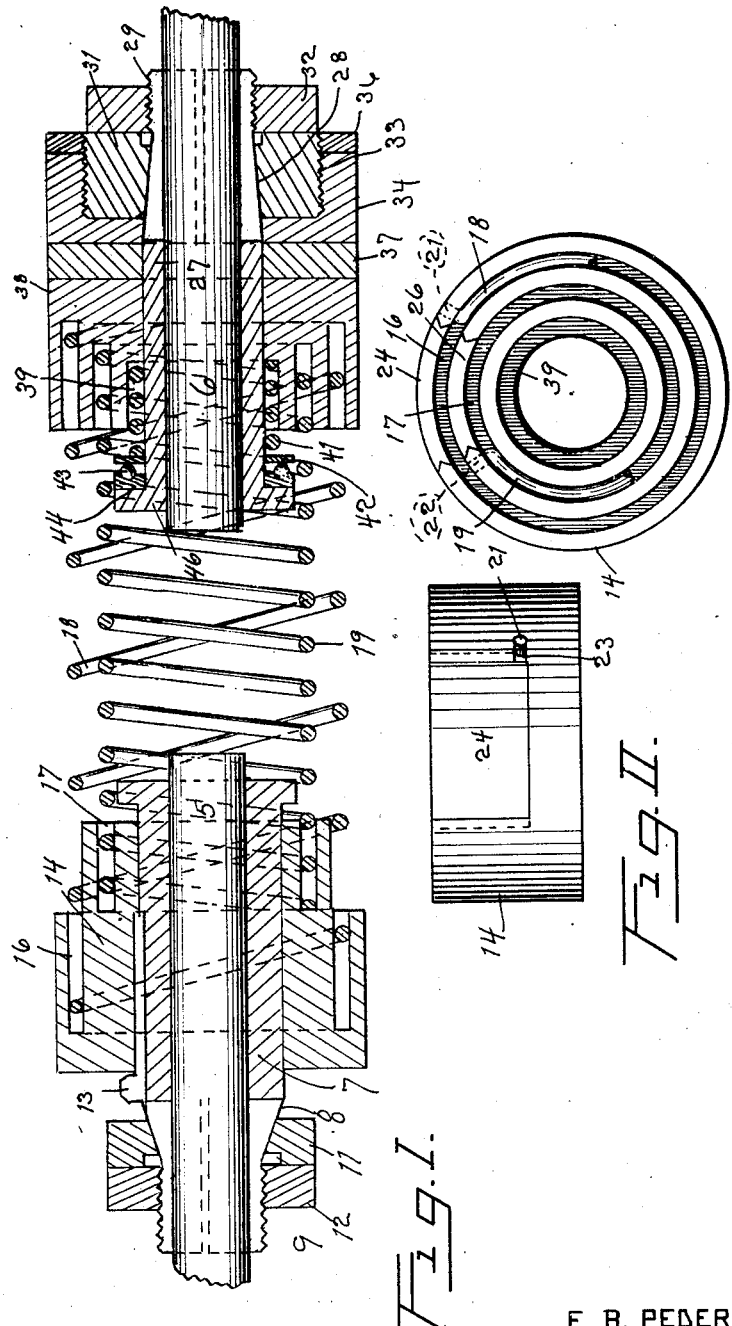
INVENTOR.
F. B. PEDERSEN
H. P. ANDERSEN
BY
ATTORNEY.

Patented Jan. 3, 1928.

1,655,332

UNITED STATES PATENT OFFICE.

FLORIAN BERTRAM PEDERSEN AND HANS PETER ANDERSEN, OF ALAMEDA, CALIFORNIA.

UNIVERSAL JOINT.

Application filed November 18, 1926. Serial No. 149,204.

This invention relates to improvements in universal joints, and has particular reference to a device capable of connecting the two ends of shafts one to the other.

The principal object of this invention is to produce a joint wherein two shafts may be connected which shafts need not be in absolute axial alignment.

Another object is to provide means whereby the joint may be connected to the shafts without conditioning the ends of the shafts in any manner.

A further object is to provide means whereby slippage may occur should a break exist which would otherwise cause an excessive strain upon the joint.

A still further object is to produce a device of this character which is economical to manufacture.

Other objects and advantages will be apparent during the course of the following description.

In the accompanying drawings forming a part of this specification, and in which like numerals are employed to designate like parts throughout the same, Figure I is a horizontal cross-section of my joint as applied to the adjacent ends of a pair of shafts, Figure II is a side elevation of one of the coupling members, and Figure III is a top plan view of Figure II.

In the coupling of machinery, it oftentimes occurs that two shafts are in substantial alignment but not in absolute alignment. It is therefore an expensive process to line up these shafts and consequently by employing our device this expense may be eliminated, as will be hereinafter seen.

In the accompanying drawings wherein for the purpose of illustration is shown a preferred embodiment of our invention, the numerals 5 and 6 refer to the ends of shafts which are in substantial alignment with each other. To the end of the shaft 5, we secure a tubular member 7 which is provided with a tapered portion 8 and a reduced threaded end 9. This threaded end 9 is slotted as well as the tapered portion 8. The tubular member 7 is provided with a bore which is serrated so that when the washer 11 is moved against the tapered portion 8 by the nut 12, the entire tubular member will be clamped upon the shaft 5, the serrations helping to effect the clamping.

Upon this tubular member is keyed as at 13 or secured in any other suitable manner a coupling member 14, within which annular grooves 16 and 17 are formed. These grooves are adapted to receive the ends of springs 18 and 19, respectively. The end of the spring 18 is bent as shown at 21, while the end of the spring 19 is bent as shown at 22. These bent ends are adapted to lie in slots as shown at 23 (see Figure II).

At 24 and 26, we have shown gates which may be removed for the purpose of inserting the spring ends in their respective slots, after which the end gates 24 and 26 are replaced.

It will be noted that the springs 18 and 19 are coiled in reverse directions, the reason being that one spring is employed for driving in one direction, while the other spring is employed for driving in a reverse direction.

Referring now to the shaft 6, the same carries a tubular member 27 having a tapered portion 28 and a threaded portion 29. The tapered portion and threaded portion are slotted so that they may be compressed against the shaft 6 by a washer 31 and a jam nut 32.

This washer 31 is externally threaded as shown at 33 so as to engage the internal thread of a nut 34 and a jam nut 36. This nut 34 contacts a washer 37 preferably made of a wear-resisting material, such as commonly employed in brake bands.

At 38, we have shown a member similar to the member 14, the only difference being that an angular groove 39 is provided. This groove accommodates a spring 41 which spring bears against a washer 42 contacting a thrust bearing 43, the race 44 of which engages the head 46 of the tubular member 27.

The result of this construction is that when the tubular member 7 and its associated parts has been connected to the shaft 5 and the tubular member 27 and its associated parts has been secured to the shaft 6, rotation of either shaft will impart rotation to the other shaft. In order to adjust the spring tension between the two shafts, loosening of the jam nuts 36 and tightening of the jam nut 34 will tend to compress the spring 41 to a point slightly over the estimated load sought to be driven by the joint, the result being that if one of the shafts become jammed as by a hot box, the joint will give by permitting the member 38 to slip upon the washer 37, the slipping point being as before mentioned controlled by the tension of the spring 41.

It will thus be seen that we have provided a universal joint which is simple in construction and efficient in operation.

It is to be understood that the form of our invention herewith shown and described is to be taken as a preferred example of the same, and that various changes relative to the shape, size, material and arrangement of parts may be resorted to without departing from the spirit of the invention, or the scope of the subjoined claim.

Having thus described our invention, we claim:—

In a friction coupling of the character described, a tubular member adapted to be secured to a shaft, said tubular member having a tapered portion and a threaded portion, said tapered portion and said threaded portion being slotted, a washer positioned on said tapered portion, a jam nut adapted to engage said washer for the purpose of compressing said tubular member, a nut threadedly engaging said washer, a friction face formed on said nut, a friction washer engaging said friction face, a coupling member rotatable on said tubular member and provided with a friction face engaging said friction washer, and resilient means interposed between said tubular and said coupling member for the purpose of maintaining the contact of said friction faces with said friction washer.

In testimony whereof we affix our signatures.

FLORIAN BERTRAM PEDERSEN.
HANS PETER ANDERSEN.